United States Patent
Lawrence et al.

(10) Patent No.: US 7,365,872 B2
(45) Date of Patent: Apr. 29, 2008

(54) CLIENT COMPUTER SYSTEM, METHOD AND COMPUTER READABLE MEDIUM COMPRISING EXECUTABLE INSTRUCTIONS FOR RENDERING PRINTABLE DOCUMENTS IN A NATIVE PRINTER LANGUAGE ON THE NETWORK

(75) Inventors: Mark A. Lawrence, Kirkland, WA (US); Steven Kiraly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/337,115

(22) Filed: Jan. 6, 2003

(65) Prior Publication Data

US 2004/0130740 A1 Jul. 8, 2004

(51) Int. Cl.
*G06F 3/12* (2006.01)
(52) U.S. Cl. ............... 358/1.15; 709/203; 709/219; 709/221; 709/248
(58) Field of Classification Search ............... 358/1.15; 709/203, 208, 219, 248, 221, 223
See application file for complete search history.

(56) References Cited

U.S. PATENT DOCUMENTS

| | | | |
|---|---|---|---|
| 4,466,065 A | | 8/1984 | Advani et al. |
| 5,580,177 A | | 12/1996 | Gase et al. |
| 5,970,228 A | * | 10/1999 | Nezu ............................ 726/34 |
| 6,144,959 A | * | 11/2000 | Anderson et al. ............... 707/9 |
| 6,184,996 B1 | | 2/2001 | Gase |
| 6,266,693 B1 | * | 7/2001 | Onaga ........................ 709/219 |
| 6,288,790 B1 | | 9/2001 | Yellepeddy et al. |
| 6,333,790 B1 | | 12/2001 | Kageyama |
| 6,452,692 B1 | * | 9/2002 | Yacoub ..................... 358/1.15 |
| 6,498,656 B1 | | 12/2002 | Mastie et al. |
| 6,563,955 B2 | * | 5/2003 | de Queiroz ................. 382/239 |
| 6,814,510 B1 | * | 11/2004 | Sabbagh et al. ............... 400/63 |
| 7,149,826 B2 | * | 12/2006 | Howard ....................... 710/62 |
| 2002/0093681 A1 | | 7/2002 | Hitaka |
| 2003/0081250 A1 | * | 5/2003 | Kimura ..................... 358/1.15 |

FOREIGN PATENT DOCUMENTS

EP    1178393    2/2002

* cited by examiner

*Primary Examiner*—Aung S. Moe
*Assistant Examiner*—Vincent Rudolph

(57) ABSTRACT

In a network facilitating print functions, a means for rendering a print job intended for a remote printer on a client computer using stored administrative settings is provided. Transparently to the client's applications, the client computer keeps the stored remote printer's administrative settings synchronized with those stored on the print server. Using the stored administrative settings, the client renders the print job to a native printer language directly cognizable by the printer before sending this rendered file to the print server for forwarding to the printer. By queuing these remote print jobs, the online status of the respective print server is also transparent to the client's applications, facilitating offline printing.

25 Claims, 7 Drawing Sheets

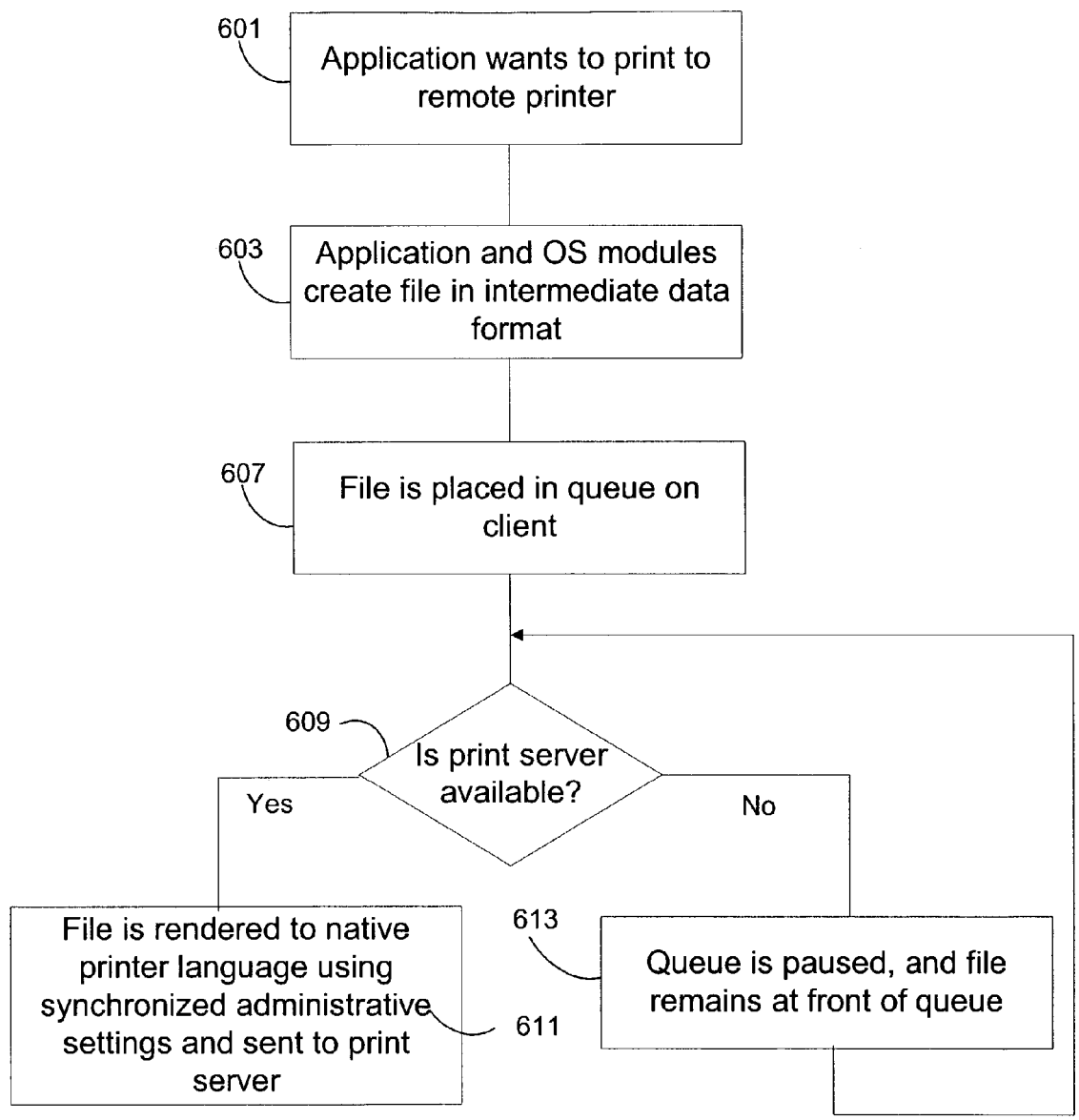

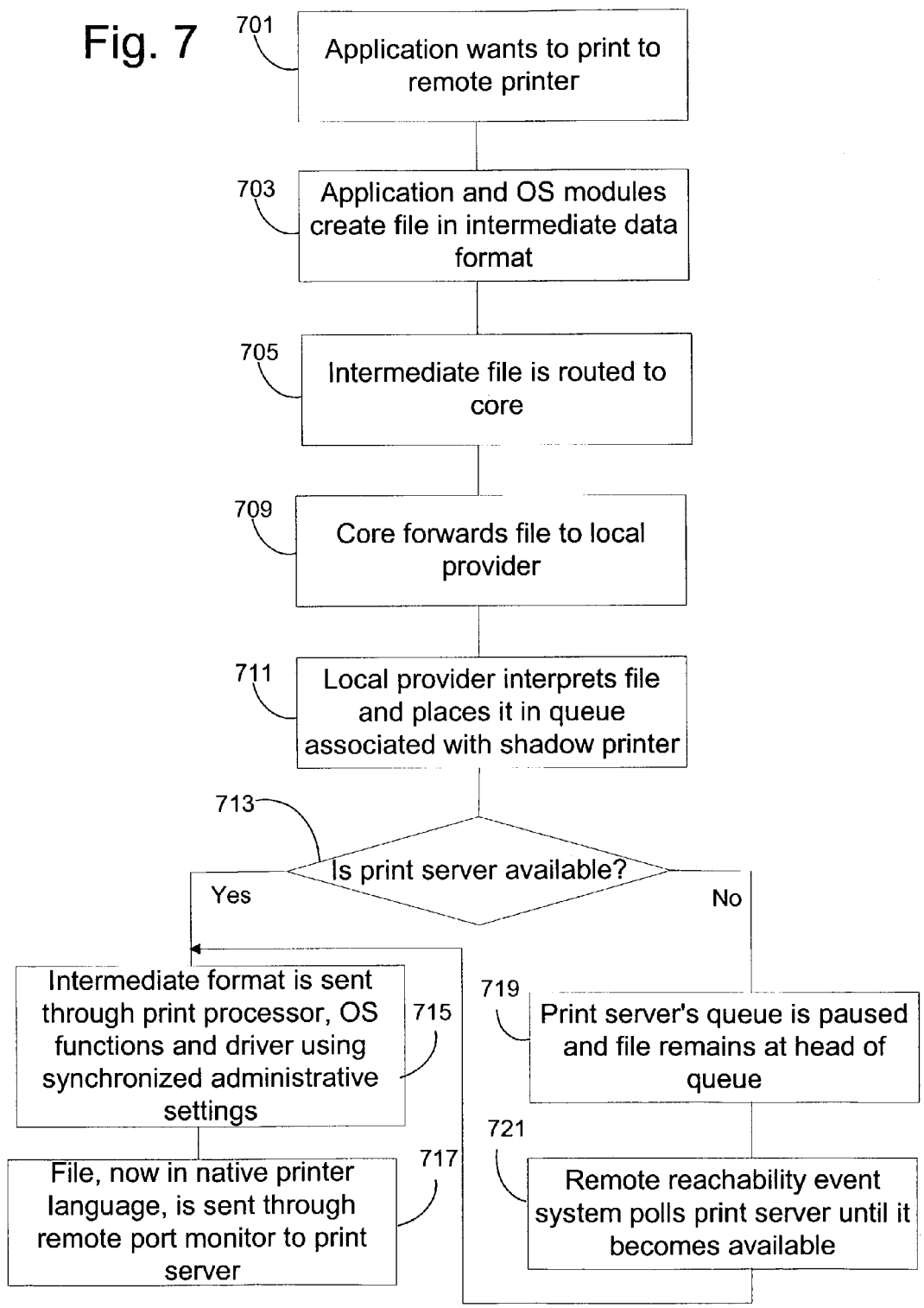

CLIENT COMPUTER SYSTEM, METHOD AND COMPUTER READABLE MEDIUM COMPRISING EXECUTABLE INSTRUCTIONS FOR RENDERING PRINTABLE DOCUMENTS IN A NATIVE PRINTER LANGUAGE ON THE NETWORK

TECHNICAL FIELD

This invention relates generally to computer network systems, and, more particularly, to printing documents in a networking environment.

BACKGROUND

In a traditional network including printers, a print server is connected to one or more physical printers and one or more print clients. Typically, these client computers send information to be printed in the form of a document, called a print job, encoded in some intermediate data format to the print server along with information regarding which printer should be used. When the print server receives the print job and printer information, it routes the job to the appropriate print queue associated with the chosen printer. As the server prints jobs from the queue to the attached printer, it interprets and translates the print jobs using stored information regarding the printer, including administrative settings, printer settings and the printer driver. The print server then renders the print jobs from the transferred intermediate data format to a native printer language and sends them to the printer. The process of rendering is simply this translation from some intermediate data format to the final printer-specific format that can be sent directly to the printer.

This thin client and robust server technology has a number of associated problems. The most significant problem with this resource-intensive server side rendering is the difficulty in scaling server networks. Since clients provide little print functionality, off-loading these tasks instead to the server, the number of actively printing clients connected to a print server must be strictly limited to avoid overloading the server. Another difficulty is inherent in applying administrative and printer settings once the print job has reached the server without informing the client. If the client is unaware of which administrative settings are in effect, the actual print output may be unexpected. Yet another shortcoming of typical print networks arises in those cases in which a client sends a print job in an intermediate data format specified by the particular printer's driver. If, for some reason, the printer drivers stored by the server and client are different, the server's translation of this intermediate data format might fail, yielding poor printing performance. Finally, since print jobs are queued solely on the server, server side rendering discourages offline printing. In a typical print network, when a server goes offline, a client is not only unable to use a printer connected to that server, but also will not queue documents for that offline printer. Thus, the responsibility falls on the user of the client to print a particular document when the server becomes available once again.

Some print network implementations have solved some but not all of the problems described above. So, for example, client side rendering has been supported in some print networks. In a client side rendering implementation, the print server routes print jobs to the appropriate printers, but the client performs the rendering of a document in the intermediate data format to the native printer language. While clients are able to pass this printer-formatted document to the print server, the problem remains that the client's intended formatting may not correctly apply the administrative settings stored on the server. In addition, off-line rendering of the document by the client might violate administrative mandates and so is often not enabled.

In other print networks, administrative settings are communicated to the client, but the client is unable to render the document and instead sends the intermediate data format to the print server for rendering. In these networks, many of the problems described in the preceding paragraphs remain. Print server scaling remains nearly impossible in these networks as the servers are still burdened with the task of rendering documents, and server and client print drivers must be assiduously matched.

As a result, there remains a need for a print network that supports offline printing, as an automated and transparent printing solution.

SUMMARY

The present invention is directed to queuing and rendering a print job on a client using administrative settings stored on the client, before sending the rendered print job to the print server. The present invention is further directed to allowing a user to execute a print command when the print server is not available, and to routing those print jobs through the appropriate print server once it is available again.

In one embodiment of the present invention, a client is in communication over a network with a print server having access to at least one printer. The print server stores all of the information necessary to print to the remote printer, including printer settings, printer drivers and administrative settings. On the client, two distinct modules provide printing functionality, a remote printing system and a local printing system. The remote printing system communicates with the print server, caching printer and administrative settings related to the remote printer. These stored settings are also periodically updated by the printing system to remain synchronized with the print server's most recent settings. In addition, the printer driver for the remote printer is also stored on the client and is accessible to both the remote and local printing systems.

When an application on the client sends a command to print to the remote printer, the application and associated programs first translate the print job into some intermediate data format. The print job is then passed through the remote printing system. Rather than being passed directly out to the print server as in legacy print networks, the print job is then routed to the local printing system, where it is stored in a local queue and eventually rendered by the local printing engine using the stored printer driver. The rendering process is performed pursuant to the appropriate stored printer and administrative settings. Since these settings are stored on the client, the server's online status is transparent to the application. The local printing engine then sends the fully rendered print job through the remote printing system to the print server.

If, at the time when the local printing engine begins sending the print job through the remote printing system, the print server is not available, the local printing system simply pauses the print job's queue until the print server comes back online. To facilitate this process, the remote printing system polls the network at predetermined time intervals for the print server and also polls whenever an indication is received that a new network node may be available. Once the print server is again logically connected to the client, the local printing system sends the print job through the remote printing architecture to the print server.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6 is a flow diagram illustrating an application printing to a remote printer according to an embodiment of the invention; and FIG. 7 is a detailed flow diagram illustrating an application printing to a remote printer using the exemplary program structure of FIG. 2 according to an embodiment of the invention.

DETAILED DESCRIPTION

Figure 1:
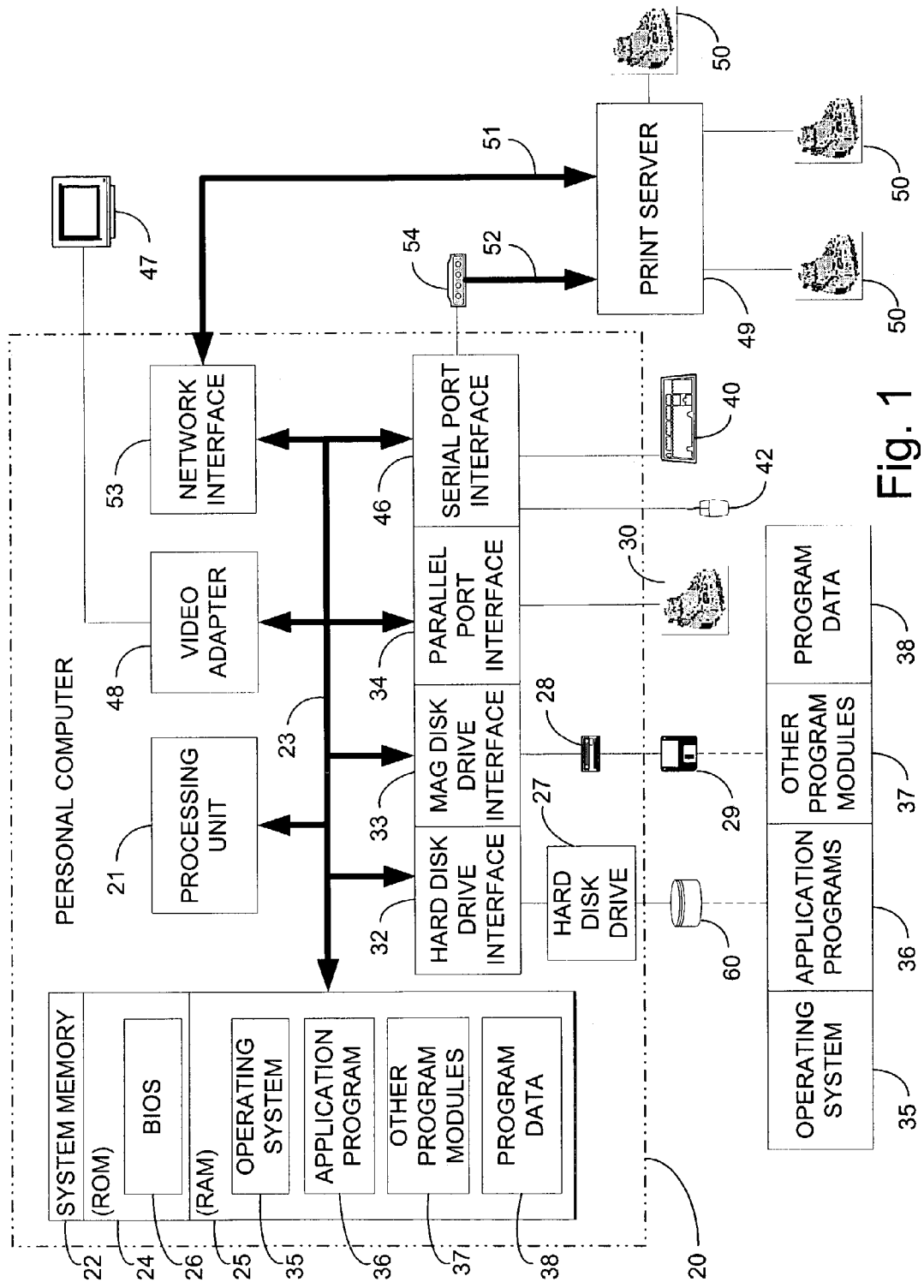
FIG. 1 is a schematic diagram generally illustrating an exemplary computer system usable in an embodiment of the invention.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a PC (PC). Generally, program modules include routines, programs, objects, components, data structures and the like that perform particular tasks or implement particular abstract data types.

The invention may be implemented in computer system configurations other than a PC. For example, the invention may be realized in hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices.

Although the invention may be incorporated into many types of computing environments as suggested above, the following detailed description of the invention is set forth in the context of an exemplary general-purpose computing device in the form of a conventional PC 20.

Before describing the invention in detail, the computing environment in which the invention operates is described in connection with FIG. 1.

The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60 and a magnetic disk drive 28 for reading from or writing to a removable magnetic disk 29.

The hard disk drive 27 and magnetic disk drive 28 are connected to the system bus 23 by a hard disk drive interface 32 and a magnetic disk drive interface 33, respectively. The drives and their associated computer-readable media provide nonvolatile storage of computer readable instructions, data structures, program modules and other data for the PC 20. Although the exemplary environment described herein employs a hard disk 60 and a removable magnetic disk 29, it will be appreciated by those skilled in the art that other types of computer readable media which can store data that is accessible by a computer, such as optical disk drives and disks, magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, ROM 24 or RAM 25, including an operating system 35, one or more applications programs 36, other program modules 37, and program data 38. A user may enter commands and information into the PC 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as the parallel port 34, game port or a universal serial bus (USB). A monitor 47 or other type of display device is also connected to the system bus 23 via an interface, such as a video adapter 48. In addition to the monitor, PCs typically include other peripheral output devices, such as speakers and a printer 30 connected through the parallel port interface 34 to the system bus 23.

The PC 20 may operate in a networked environment using logical connections to one or more remote computers, such as a print server 49. The print server 49 may be another PC, a server, a router, a network PC, a peer device or other common network node, and typically includes many of the elements described above relative to the PC 20, although, often a print server 49 is dedicated to routing print requests from the PC 20 to attached printers 50. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 46. In a networked environment, program modules depicted relative to the PC 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In accordance with one important aspect of the invention, a client PC 20 renders documents locally using stored administrative settings synchronized with the print server's 49 administrative settings and queues documents locally before forwarding them to the print server 49 in an appropriate native printer language.

In keeping with the invention, the client PC 20 has the further ability to prepare documents for rendering to a remote printer 50 while not logically connected to the print server 49. The client PC 20 can then poll the print server 49 until it becomes available, and render the documents and forward them for printing at that later time.

Figure 2:
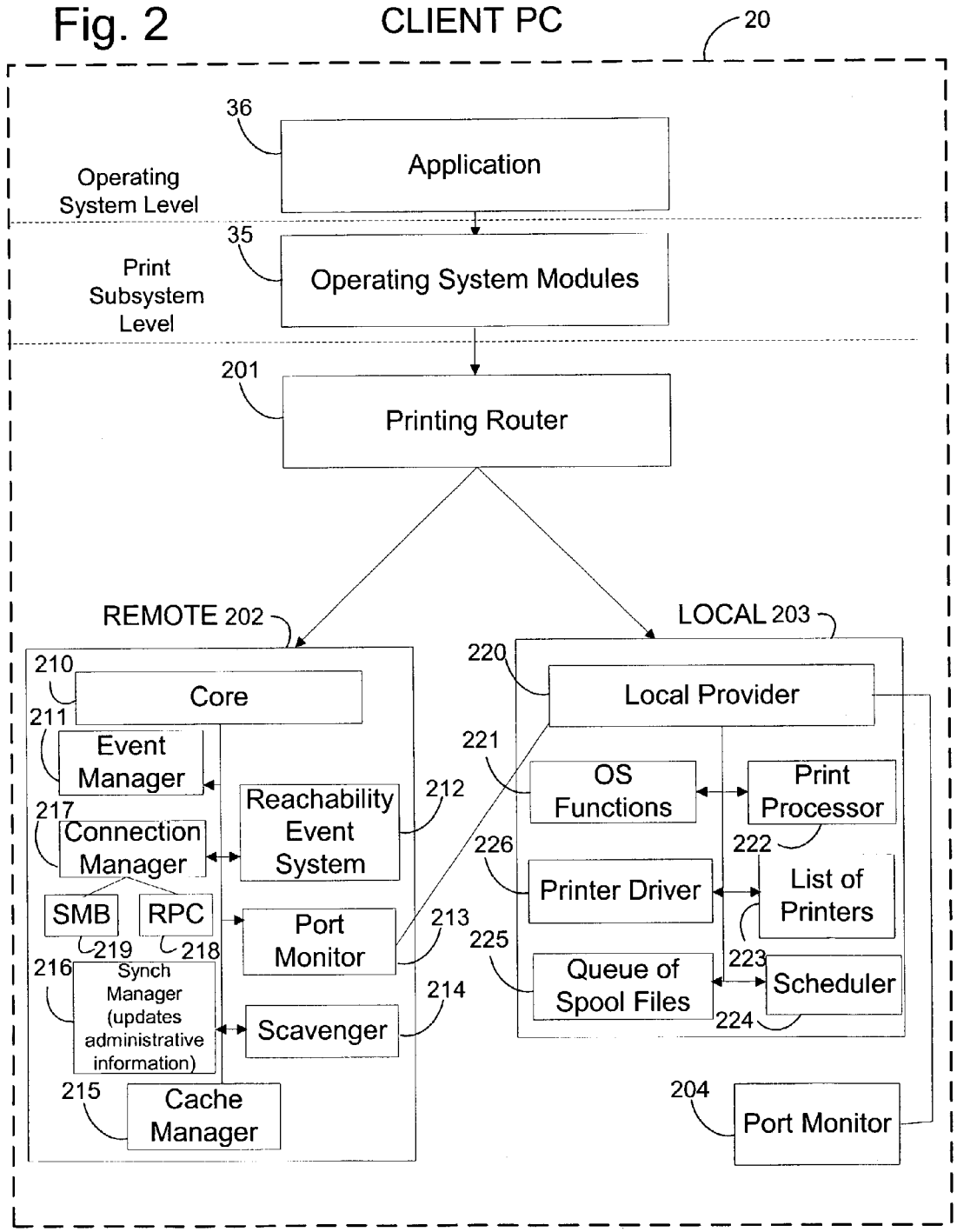
FIG. 2 is a schematic diagram illustrating an exemplary program structure for implementing an embodiment of the invention.

Turning to the figures, an exemplary software architecture for implementing an embodiment of the invention is shown in FIG. 2. On the client PC 20, a single application 36 is shown running in the user-level, the level in which programs running on a computer interact with the computer user. In other embodiments, there may be many applications running simultaneously on the client PC 20, each of which can access the printing subsystems 202-203. In order to print to printers connected locally or remotely to the PC 20, most applications 36 do not implement all of the required functionality themselves, but instead rely on external modules. However, in alternative embodiments, the printing subsystems may be part of the application itself 36, part of the operating system 35 or a separate program using underlying operating system functions.

In the embodiment shown in FIG. 2, an application 36 wishing to print a document communicates first with operating system modules 35. These operating system modules 35 in conjunction with the application 36 provide the functionality necessary to translate the application-specific document data into a more universal intermediate data format, and transfer the newly formatted document to the printing subsystem. In another embodiment, the application 36 itself translates the application-specific document data into the universal intermediate data format without the assistance of the operating system 35. In yet another embodiment, the application 36 sends the application-specific document data to the printing subsystem along with some indication of which application 36 has sent it, and the printing subsystem can translate the application-specific data into a native printer language. Alternatively, the application 36 implements the print subsystem itself and later directly translates the application-specific data into native printer language.

After the application-specific data has been translated into an intermediate data format, the operating system modules 35 forward the document to the printing router 201, the first level of the printing subsystem. This printing router 201 routes a print job according to its destination printer: whether it is a remote printer 50 connected to the client PC 20 through a print server 49, or a local printer 30 connected logically to the client PC 20 through the parallel port interface 34 or some other communications medium without utilizing a print server 49. In one embodiment, the printing router 201 makes this decision based on a separate remote or local indicator sent along with the print job by the operating system modules 35 or application 36. Alternatively, the printing router 201 may derive the indicator from the document itself. If a print job is intended for a remote printer 50, the group of sub-modules dedicated to remote printing functionality 202 receives and processes it. On the other hand, if the print job is intended for a local printer 30, the group of sub-modules dedicated to local printing functionality 203 receives and processes it. In other embodiments, the printing router 201 may be an optional component of the printing subsystem. Instead, a client PC 20 may only print to remote or local printers and only that particular set of sub-modules may be implemented. The client PC 20 may also print to both remote and local printers but may recycle many of the same sub-modules for both print functions.

In the embodiment disclosed in FIG. 2, the local printing subsystem 203 comprises the illustrated components, although in other embodiments, the functionality represented by these components may be implemented in fewer or more components in the local printing subsystem 203. A local provider 220 coordinates the other components of the subsystem 203 and orchestrates the entire local printing process from start to finish. Operating system functions 221 perform miscellaneous translation and transfer functions, providing access to what was already implemented by the operating system 35. When a local printer 30 is first registered with the operating system 35 for active printing functionality, the local printing subsystem 203 stores printer-specific data in the list of printers 223. This data often includes the specifications of the local printer 30 and the driver and settings to be used. In alternative embodiments, a printer 30 is registered only when a print job is sent, and the various settings specified in the list of printers 223 are derived and applied at print-time.

When a print job is routed to the local provider 220, the job is first registered with the scheduler component 224, which places the job in the appropriate queue of spool files 225. These spool files store information representing the document in the intermediate data format and the various printing characteristics that should be used in rendering the document. When a job is ready for de-spooling (i.e., ready to be printed), the scheduler 224 transfers the spool file from the queue 225 to the print processor 222, which readies the document for printing. The print processor component 222 then forwards the document to the printer driver 226, for rendering to the native printer language. The rendered document, now formatted specifically for the local printer 30, is sent back to the local provider 220, which sends the rendered document to the appropriate printer taking advantage of the operating system functionality provided through the port monitor 204. When a local printer 30 is the target, the port monitor 204 may use, for example, the parallel port interface 34. By accessing operating system functionality, the port monitor 204 can potentially communicate through and monitor a wide variety of communications mediums.

In alternative embodiments, a queue of spool files 225 need not be maintained by the local printing subsystem 203, but can instead be implemented in the operating system 35 or application 36. For example, an application 36, in close communication with the printing subsystem 203, would only begin printing a new document once the old document had been completely printed. Although the local system 203 described with reference to FIG. 2 is typically found on many PCs 20 today, in other embodiments, various components described with reference to FIG. 2 could be replaced with similar, but distinct modules.

In keeping with the present invention, as disclosed in FIG. 2, the remote printing subsystem 202 is broken down into the illustrated components. In other embodiments, the functionality represented by these components is implemented in fewer or more components. The first component, core 210, provides similar functionality to that provided by the local provider component 220; it orchestrates and coordinates the various other remote components while tracking a particular print job from receipt to completion.

In one embodiment, once a remote printer 50 has been chosen for active printing functionality, the core 210 of the remote printing subsystem 202 communicates, through the connection manager 217, which has access to different networking protocols (such as SMB 219 and RPC 218), with the print server 49 to which the remote printer 50 is attached. The connection manager 217 then receives information related to the remote printer 50, including administrative settings, printer settings, drivers and other settings. This information is passed back to the core 210, which uses both the local printing subsystem's list of printers 223 and the cache manager 215 as storage space. This stored information is periodically synchronized by the synchronization manager 216 to match the most recent information stored in the print server 49. In some embodiments, the synchronization manager 216 requests updated information after a certain length of time. In other embodiments, the synchronization manager 216 updates the stored information only after receiving notification that a change in the information has been registered on the print server 49. In yet other embodiments, when the information stored on the print server 49 is modified by the core 210 on the client 20, these settings are preemptively placed in the cache.

Subsequently, when a print job is routed to the remote printing subsystem 202, the core 210 ensures that the various settings and drivers are up-to-date, using the synchronization manager 216, and then renders and prints the job using local printing and remote printing functionality. If the print server 49 to which the remote printer 50 is attached is not available, the core 210 signals the reachability event system 212 to poll the network for the print server 49. When the server 49 becomes available, the core 210 is notified, and the rendered print job sent. In other embodiments, the print job is cancelled if the print server 49 is unavailable, or the application 36 itself or other system functions continues to send the print job at certain predetermined time intervals, until the print server 49 comes back online. In the embodiment disclosed in FIG. 2, although various components are described above as communicating with the print server 49, only the connection manager 217 has a logical connection with the print server 49, and all communications are routed through the connection manager 217. In alternative embodiments, these other components access the network hardware through those same network protocols used by the connection manager 217.

The remaining components of the remote printing subsystem 202 provide support for those components described above. The event manager 211 functions to transfer various event notifications between components in the remote printing subsystem 202. The port monitor 213 coordinates communications sent through the network 51 to the print server 49 and responds to system requests similar to those used with the external port monitor 204. Finally, the scavenger 214 deletes printer and job instances that have outlived their usefulness for various reasons (for instance, if the requesting user has logged off of the client PC 20).

The software architecture of the remote printing subsystem 202 described in FIG. 2 will be better understood with reference to the following FIGS. 3-7, as the various functions performed by the architecture are described in further detail.

Figure 3:
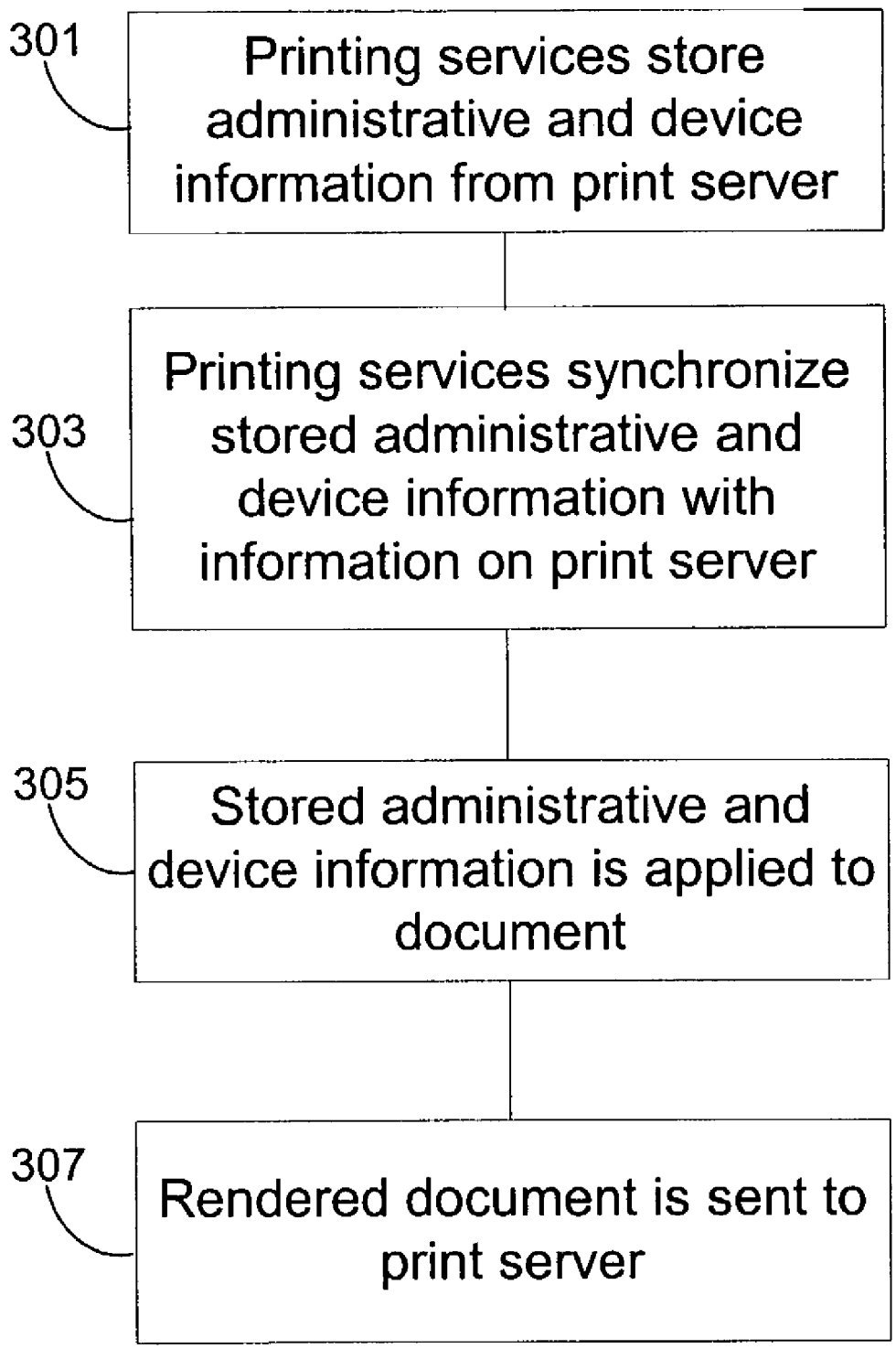
FIG. 3 is a flow diagram illustrating the printing steps taken by the computer system according to an embodiment of the invention.

As described in FIG. 3, the printing services according to the present invention perform a number of important tasks to support client side rendering and administrative information maintenance. During step 301, the printing services coordinate the storage of administrative and device information related to a particular printer 50, as received from the print server 49. In one embodiment, components of the printing services coordinate the receipt of administrative and device information from the print server 49. This information is then stored in data structures located on the client PC 20, where it can be subsequently accessed to correctly print documents.

During step 303, as long as this printer 50 remains active, the printing services continue to synchronize the administrative and device information on the client 20 with that stored on the print server 49. In one embodiment, this synchronization is carried out by periodically replacing the information stored on the client 20 with that on the print server 49. In another embodiment, the information is only synchronized after the print server 49 has updated some piece of information relevant to the appropriate printer 50. In yet another embodiment, both of these methods of synchronization are implemented, increasing network traffic while also increasing the accuracy of the information stored on the client PC 20.

During step 305, the printing services apply the stored administrative and device settings to the document. By applying these settings, the printing services ensure that the document's formatting is appropriate and that network security issues are resolved. Since these settings are relatively current with those stored on the print server 49 even if the server is unavailable, offline rendering is facilitated. The details of applying these settings are further described below.

Finally, during step 307, the printing services send the rendered document to the print server 49 for forwarding on to the printer 50. By rendering the document on the client PC 20, a great computational burden is lifted from the print server 49, making it more easily scalable. Since the settings on both the server 49 and client 20 are frequently synchronized according to step 303, the rendering process will most likely be identical on both, thus obviating concerns with aberrant printing processes.

Figure 4:
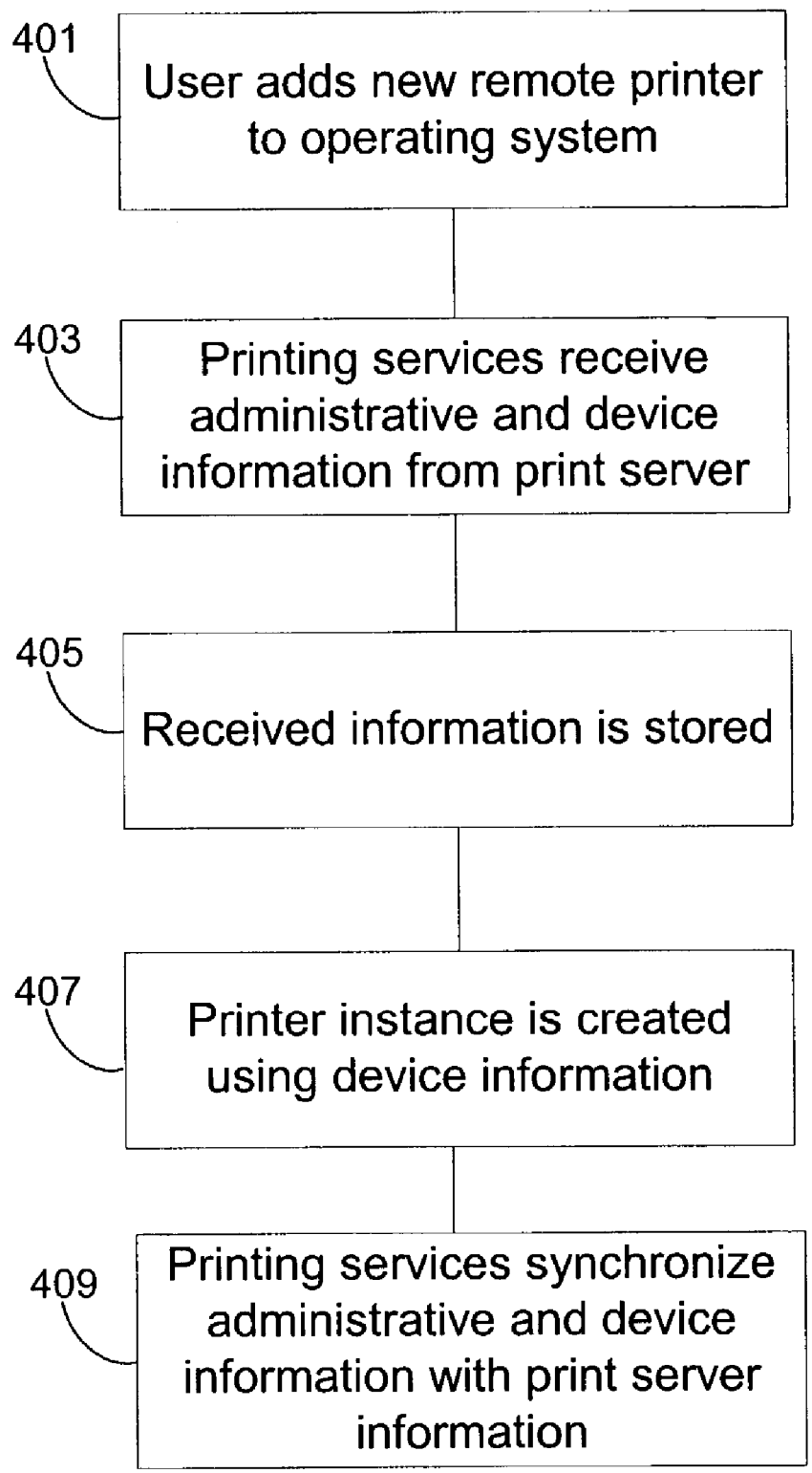
FIG. 4 is a flow diagram illustrating a remote printer instantiation according to an embodiment of the invention.

While the foregoing steps were described quite generally, the following FIGS. 4-7 describe embodiments of the present invention in further detail. The first step in printing a document to a specified remote printer 50 is registering the printer 50 with the operating system 35 for future printing tasks. Although printer registration is well known in the art, particular aspects of the present invention make the registration process disclosed in FIGS. 4 and 5 unique. FIG. 4 describes a general process by which an operating system 35 registers a printer 50 in keeping with the present invention, while FIG. 5 describes one way of doing so in the exemplary software architecture of FIG. 2.

As is well known in the art, the present embodiment contemplates a method for adding a new remote printer 50 in the operating system 35 during step 401, such that subsequent print commands can identify the printer 50. In one implementation, the operating system 35 browses through the network, retrieving from available print servers 49 lists of their connected remote printers 50. The operating system 35 then adds these remote printers 50 to a database automatically or enables the user to select those printers 50 to which the user would like to send printjobs. In other embodiments, the user specifies the network path of a remote printer 50 the user would like to add, and this new printer is registered in the operating system's database. In still other embodiments, this initial registration is not performed by the operating system 35, and the subsequent steps 403-407 are only performed when a particular print job is sent by an application 36.

Once a user has registered a remote printer 50, those services that control printing receive administrative and device information from the print server 49 during step 403. In different implementations, these printing services are implemented in the application 36, operating system 35, or printing subsystems 202, 203. The device information received from the print server 49 comprises driver version information, the printer driver itself, specifications of the printer, modifications made to the printer, preferred output of the printer, etc. The administrative settings of the print server 49, on the other hand, comprise the preferred settings for the remote printer 50, the particular settings allowed for the remote printer 50, the level of access allowed for client PCs 20, etc. In order to retrieve this information, the client PC 20 requests this information from the print server 49 during registration. In one embodiment, this retrieval is an asynchronous process that does not slow down the PC 20. In another embodiment, the information is retrieved from the print server 49 only when a print job is about to be processed.

This received information is then stored on the client PC 20 during step 405. Storing this information locally enables the client PC 20 to subsequently render documents using the administrative and printer settings without accessing the print server 49. This enables a faster rendering process (as the client PC 20 does not need to wait for the results of a network communication) and also enables offline rendering (as the client PC 20 can use stored administrative settings). In one embodiment, the printing subsystems, applications 36 and operating system 35 have access to this stored information.

Using the device information received from the print server 49, a printer instance is created on the client PC 20 during step 407. A printer instance simply refers to a data abstraction that stores a bundle of device information, such that the printing services can access this device information when processing a print job. By separating the device information representing different printers, printer instances facilitate the execution of a print command sent from an application 36 to a particular printer. As is well known in the art, printer instances are often maintained on clients 20 to represent locally connected printers 30, with information entered by the user or detected through a common communications interface, such as the parallel port interface 34, USB, etc. In one implementation, the printer instance representing the remote printer 50 is stored in a similar format to those representing local printers 30.

Finally, some component of the printing services also synchronizes the administrative and device information with that stored on the print server during step 409. This step is substantially the same as that described with reference to step 303 above. By keeping the administrative and device information stored on the client 20 current with that stored on the print server 49, this embodiment facilitates accuracy in printing and offline rendering.

Figure 5:
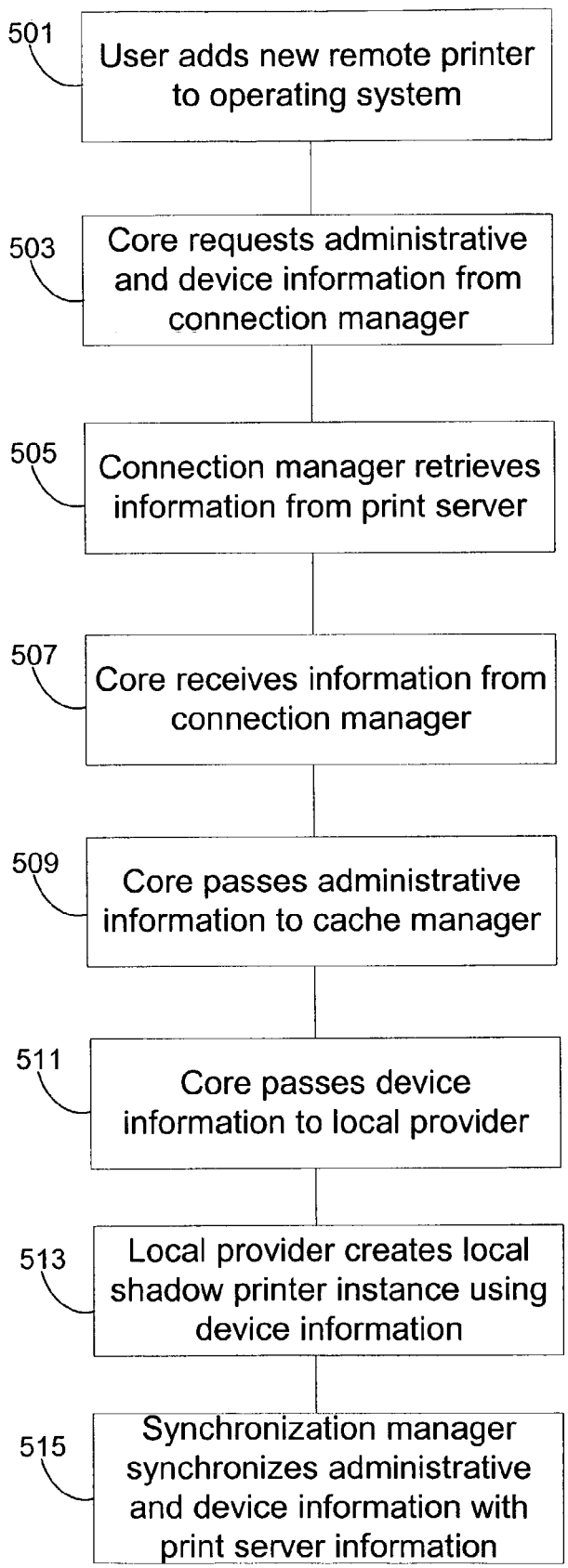
FIG. 5 is a detailed flow diagram illustrating a remote printer instantiation using the exemplary program structure of FIG. 2 according to an embodiment of the invention.

Having disclosed these steps in a high-level overview in FIG. 4, FIG. 5 describes one implementation of printer registration in the exemplary software architecture of FIG. 2. The first step, 501, is identical to step 401, and depends upon similar legacy protocols implemented by the operating system. The remaining steps break down approximately as follows: steps 503-507 correspond to step 403, steps 509-511 correspond to step 405 and step 513 corresponds to step 407.

Once the user has added a new remote printer 50, the operating system 35 forwards a notification to the core component 210 of the remote printing subsystem 202. During step 503, the core 210 then requests the administrative settings and device information related to the remote printer 50 from the connection manager 217. In alternative embodiments, this functionality need not be implemented in different components. Indeed, the core 210 and connection manager 217 can be part of the operating system 35 or application 36.

Upon receiving this request, the connection manager 217 uses an appropriate network protocol 218, 219 to retrieve the information from the print server 49 during step 505. In one embodiment, the connection manager 217 prefers to use the remote procedure call (RPC) protocol 218 to communicate with the print server 49, while retaining the ability to communicate using other popular protocols, such as SMB (or Samba in the UNIX environment) 219. In alternative embodiments, other protocols are used to implement the communications channel between the client PC 20 and the print server 49. In the event that one or the other of the client PC 20 and print server 49 does not support a particular networking protocol, the two computers try alternative protocols until a mutually understandable protocol is chosen. The print server 49 typically stores administrative and device information in a data abstraction similar to the printer instance described above. Thus, in one embodiment, the connection manager 217 requests information on a particular remote printer 50, and the print server 49 matches the network identifier of the printer 50 with the printer's associated characteristics stored in the data abstraction and returns those associated characteristics.

The connection manager 217, on receiving this information, forwards it to the core 210 for processing during step 507. In one embodiment, the core 210 stores the administrative settings applied by the print server 49 in the cache entries of the remote subsystem's cache manager 215 during step 509. The cache manager 215 is a data structure comprising cache entries that store information. In one implementation, these cache entries are associated with their respective remote printers using an identifier table, preferably a hash table to make accessing the cache entries faster. Alternatively, other storage means, well known in the art, are used to store and access the administrative settings.

In one embodiment, while the administrative settings are stored in the remote printing subsystem 202, the other device information received by the core 210 is forwarded to the local provider 220 during step 511. During step 513, the local provider 220 then creates a local shadow printer instance representing the remote printer 50 in its list of printers 223. This local shadow printer instance corresponding to the remote printer 50 is formatted identically to the local printer instances corresponding to local printers 30 described above. However, whereas local printer instances representing local printers 30 send print jobs through the external port monitor 204, the local shadow printer instances representing remote printers 49 send print jobs through the remote printing subsystem's port monitor 213. Preferably, the local printing subsystem 203 treats these local shadow printer instances like all other local printer instances, utilizing the local printing functionality when processing print commands to these remote printers 50.

During step 515, a process in the remote printing subsystem 202 ensures that the administrative and device information stored on the client PC 20 is synchronized with that stored on the print server 49. In one embodiment, the synchronization manager 216 periodically requests updated information from the print server 49, which then replaces the information stored in the cache manager 215 and in the local printing subsystem 203. In another embodiment, the synchronization manager 216 periodically compares the locally stored administrative and device information with the information on the print server 49. If they differ, the synchronization manager 216 then replaces the differing information stored in the cache manager 215 and local printing subsystem 203. In yet another embodiment, the core 210, through the connection manager 217, polls the print server 49 to determine if the administrative and device settings on the print server 49 have changed. The print server 49 may maintain a small data structure indicating whether or not a change has occurred, which data structure may be accessible by the core 210. The response received by the core 210 is sent to the synchronization manager 216, which then updates the locally stored settings appropriately. These methods are simply illustrative, and other methods may be used by the synchronization manager 216 or another component of the remote printing subsystem 202 to keep the administrative and device settings current.

Once a remote printer 50 has been registered with the operating system 35, an application 36 can send print jobs to it. The unique printing process contemplated by the present invention is described in FIGS. 6 and 7. FIG. 6 describes a general process by which an application 36 prints to the remote printer 50, while FIG. 7 describes one way of doing so in the exemplary software architecture of FIG. 2.

The first step in printing data to a remote printer 50 is, of course, accessing an application 36 that has print capability, and taking advantage of that capability. Thus, at step 601 the user sends some print command from the application 36, indicating that a document should be sent to the remote printer 50. In different applications, different methods are used to carry out this function. In one implementation, the user selects a Print command from a menu, or from pressing a combination or sequence of keys on a keyboard 40. This print command, however chosen, then requests input from the user regarding which printer to target. In alternative implementations, the remote printer 50 may be pre-selected as the current, "default" printer.

After processing this print command, the application 36, with the help of operating system modules 35, translates the document stored in the proprietary application format into an intermediate data format during step 603. This intermediate data format contains enough information to accurately print the document on the remote printer 50. However, this intermediate data format is neither specific to the remote printer 50, nor to the application 36. In this way, the document can be formatted and modified without worrying about its particular application source or target printer, and those subsystems executing these transformations can be largely independent of the choice of printer 50 or application 36. In other embodiments, however, an intermediate data format may not be needed. In the case described above, in which the application 36 prints directly to the remote printer 50, without accessing functionality provided by the underlying operating system 35, the application 36 simply uses its own application specific format until the file must be translated into a native printer language for transmission. In still other embodiments, the formatting changes made to documents are executed by the printing subsystems upon each different application specific format, obviating a translation into an intermediate data format.

Once the intermediate file has been created, it is placed on a queue on the client 20 during step 607. In one embodiment, this queue represents a data structure with one queue per printer instance. As documents are added to the queue, they are placed in a first-in-first-out format with certain exceptions, as is well known to those of skill in the art. The first document added to the queue is the first one printed to the remote printer 50. The print server 49 attached to the remote printer 50 also sends data regarding its own queue to the client 20, and the two computers can merge their queues, such that the client 20 sends a print job at the appropriate time relative to the other print jobs received by the print server 49. The client 20 can also use the received data to inform the user when its print job will be printed, and in what order with respect to other user's documents. In other embodiments, the queue is implemented within the application 36, or no queue can be implemented, and if an original print request is denied, the application 36 sends print requests at predetermined time intervals.

When the document reaches the front of the queue and is ready to be sent to the remote printer 50, the client 20 determines whether or not the print server 49 is available at step 609. As is well known in the art, the client 20 makes this determination in one of a number of potential ways, including: by simply pinging the print server 49 using underlying network functionality, by using one of the agreed upon network protocols to ask the print server 49 if it can accept print jobs, or by assuming the print server 49 is available until a print request fails. If the client 20 determines that the print server 49 is available, the intermediate file is rendered to the remote printer's 50 native printer language, and the resulting document is sent to the print server 49 during step 611.

Since information regarding the remote printer's 50 driver, printer and administrative settings is stored on the client 20 as described in steps 405-407, the intermediate file can be efficiently rendered to the native printer language. These stored settings can be stale settings, stored at the last update by the synchronization manager 216, or fresh settings, received from the print server 49 immediately prior to printing the particular document. In one embodiment, utilizing fresh settings is the preferred method, although network traffic is increased. In alternative embodiments, stale settings are preferred, although it is more likely that the server 49 and client 20 settings will be unsynchronized. While the device and printer settings delineate the physical attributes of the remote printer 50, the administrative settings preferably call for various formatting edits and printing edits (such as printing pages to two sides of a sheet) to be performed on the intermediate file as it is rendered. In other embodiments, the administrative settings are received by the application 36 prior to step 603, and the application 36 uses these settings to create an intermediate file with the administrative settings already applied. In still other embodiments, the printer and administrative settings are first applied to the intermediate file, and then, using the printer settings and driver, the intermediate file is converted into a document that is readable by the remote printer 50. Such a document is written in the remote printer's 50 native printer language. Once rendered, this document is then sent to the print server 49, where it is routed to the appropriate remote printer 50. The print server 49 adds this document to the appropriate printer's queue as necessary, but unlike a typical printing network, the print server 49 need not perform any file conversions or formatting changes before sending the file to the printer 50. By rendering the document on the client 20, the print server's 49 resources are freed for other tasks.

If the print server 49 is not available when polled by the client 20, the intermediate file simply remains in the queue for that printer at step 613. In one embodiment, the client 20 polls the print server 49 at predetermined time intervals to determine whether or not it has become available. The client 20 can also wait for network or device activity indicating that the print server 49 may have become available. The client 20 then polls at both predetermined time intervals and after certain activity, to facilitate printing as quickly as possible. In alternative embodiments, the client 20 polls the print server 49 at predetermined time intervals. Unfortunately, the time intervals are usually either too long, extending the possible wait period before a document is printed, or too short, in which case valuable network and CPU resources are used in polling. In another embodiment, the client 20 listens to device and network activity and polls the print server 49 after receiving an announcement. However, if the client 20 misses the device or network announcement, the client 20 will never poll the print server 49 and never print the document. By combining these two methods, the first embodiment provides the advantages of both, while avoiding many of the disadvantages.

Having described these steps at a high-level, FIG. 7 describes one implementation of a printing process according to an embodiment of the present invention in the exemplary software architecture of FIG. 2. The first steps, 701-703, are identical to steps 601 and 603. The remaining steps break down as follows: steps 705-707 correspond to step 605, steps 709-711 correspond to step 607, step 713 corresponds to step 609, steps 715-717 correspond to step 611 and steps 719-721 correspond to step 613. Since the initial steps of sending a print command through the application 36 and creating a file in the intermediate data format have been covered in some detail above, the description below will begin with step 705.

Once the application 36 and operating system modules 35 have created the intermediate file format, the intermediate file is routed to the remote printing subsystem's core 210 by the printing router 201 during step 705. In one embodiment, the printing router 201 maintains a list of remote and local printers registered by the operating system 35, and when a print job is forwarded to the router 201, it is sent to the appropriate printing subsystem on the basis of which list the target printer is a member. In alternative embodiments, the print job is sent with a separate indication of whether or not the print job is intended for a remote or local printer, and the indication is intercepted and processed by the router 201.

Having received and processed the intermediate file, during step 709, the core forwards the intermediate file to the local provider 220. In one embodiment, this forwarded file is received and treated by the local provider 220 like a local print job. This embodiment of the invention thereby uses local printing functionality in remote printing situations, obviating the need to duplicate many of these functions. During step 711, the local provider 220 determines to which local shadow printer instance the print job is targeted and places it in the queue associated with that local shadow printer instance. In alternative embodiments, the remote printing subsystem 202 implements the local printing functionality itself and therefore places the print job in a remote queue, freeing the local printing subsystem 203 to focus on local print jobs.

Once a print job has made it to the front of the appropriate queue, before the rendered document is sent to the print server 49, the remote port monitor 213 first determines whether the print server 49 is available, step 713. In one embodiment, the remote port monitor 213 checks for availability before any rendering is performed by the local printing subsystem 203. In an alternative embodiment, the processing of portions of the print document is pipelined. Therefore, the remote port monitor 213 checks for availability only after some rendering has been performed by the local printing subsystem 203. Once it has been determined that the server is unavailable however, both embodiments converge, as the data partially rendered in the second embodiment is lost.

If the print server 49 is available, in an exemplary embodiment, the local provider 220 forwards the print job to the print processor 222, which applies the stored device and administrative settings associated with the local shadow printer instance. These administrative settings include those settings described above with respect to step 611. Since the cache entries stored by the cache manager 215 match administrative settings to their respective remote printers 50 and print servers 49, the printer's identification is sent to the cache manager 215, and the requested settings are returned. In certain cases, the core 210 verifies that the settings presently stored are synchronized with those stored on the print server 49. In one embodiment, the core 210, in communication with the synchronization manager 216, uses the connection manager 217 to update the cache manager 215 with the latest administrative settings as described at step 509 above. However, if the print server 49 is not available during this process, the print processor 222 uses the stored device and administrative settings without updating them. By allowing the printing process to continue without updating the stored settings, this embodiment facilitates offline printing and rendering. In other embodiments, the core 210 requires updating the administrative settings with the print server 49 before the printing process continues, hindering offline printing and rendering. In still other embodiments, the core 210 does not update the administrative settings, but instead uses the administrative settings as last synchronized by the synch manager 216 until explicitly informed to update.

During step 715, the document is then translated into the appropriate native printer language by the printer driver 226 and operating system functions 221 stored on the client 20. This application of device and administrative settings and translation by the appropriate printer driver are performed using methods well known in the art. In fact, in one embodiment, these functions are executed by largely unmodified, legacy local printing subsystems 203, to which the ultimate destination of the file is transparent.

In an embodiment of the invention, the processing of portions of a print document is pipelined. Thus, during step 717, the portions of the document now in a native printer language are sent through the remote printing subsystem's port monitor 213. As sections of the document are rendered, they are sent through the port monitor 213 while subsequent sections are rendered. Of course, as described above, the remote port monitor 213 only orchestrates these tasks. The remote port monitor 213 communicates with the connection manager 217, which implements the network protocols necessary to send print jobs to the print server 49. In alternative embodiments, the remote port monitor 213 need not simultaneously send the document as it is rendered. Instead, the local provider 220 renders the document before placing it in the queue of spool files 225, or the local provider 220 renders the document completely from the queue before forwarding it to the port monitor 213. The precise manner of carrying out the identified operations is not essential to the implementation of the invention.

As disclosed in FIG. 7 at step 713, if the remote port monitor 213 determines that the print server 49 is not available, control passes to step 719 where the application of the settings and translation by the local printing subsystem 203 are halted, and the client's queue corresponding to the print server 49 is paused. Thereafter, during step 721, the client 20 begins polling the server 49. In one embodiment, the queue managed by the local provider 220 is paused by the remote port monitor 213, as this is a simple, well known way of handling printer failure in many existing local printing subsystems 203. In alternative embodiments, the local printing subsystem 203 implements any particular method of dealing with printer failure, including canceling all print jobs and indicating that the application 36 should resend print job data at some time in the future.

In an embodiment of the invention, during step 721, the reachability event system 212 incorporated in the remote printing subsystem 202 uses the connection manager 217 to poll the print server 49. The reachability event system 212 preferably implements one of the methods of polling described above with respect to step 613. Once the remote reachability event system 212 sends a notification to the core 210 that the print server 49 is available, the queue is un-paused, and the print operation continues to step 715, wherein the intermediate file is processed and sent to the print server 49.

In the event that some or all of the remote printing subsystem's components should fail, or a user logoff before all print jobs have been executed, one embodiment of the invention also provides for a scavenger component 214. The scavenger 214 ensures that any local shadow printer instances, cached entries or spool files corresponding to jobs that have been cancelled or that should no longer be printed are deleted. Thus, the potential difficulties inherent in coordinating print jobs across multiple subsystems and components are potentially mitigated by this component's functionality.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Furthermore, the illustrative steps may be modified, supplemented and/or reordered without deviating from the invention. Therefore, the invention as described herein contemplates all such embodiments as may come within the scope of the following claims and equivalents thereof.

We claim:

1. A method for remotely printing a document on a network comprising a networked client computer, a target networked printer device and a print server computer, the method comprising:
    storing administrative settings for the target networked printer device applied by the print server computer on the client computer, the administrative settings including at least information sufficient to permit the client computer to render the document in a native printer language of the target networked printer device;
    updating, using a synchronization manager on the client computer, the stored administrative settings to maintain synchronization with current print server computer administrative settings, the synchronization manager being configured to perform the updating at a periodic time interval;
    applying the stored administrative settings to the document on the client computer;
    based on the administrative settings, rendering the document in the native printer language of the target networked printer device on the client computer; and
    sending the rendered document to the print server computer to print without additional conversion of the rendered document by the print server.

2. The method of claim 1, wherein the steps of rendering the document on the client computer and sending the rendered document occur substantially simultaneously.

3. The method of claim 2, wherein the step of rendering the document on the client computer further comprises:
    polling the network when the print server computer is not available to determine when the print server computer becomes available.

4. The method of claim 3, wherein the step of polling the network further comprises polling the print server computer in response to device and network activity indicating that the print server computer may be available.

5. The method of claim 3, wherein the step of polling the network further comprises periodically polling the network.

6. The method of claim 1, wherein the step of rendering the document on the client computer utilizes local print functionality.

7. The method of claim 6, wherein the step of sending the rendered document to the print server computer utilizes local print functionality.

8. The method of claim 1, wherein the step of rendering the document on the client computer is performed asynchronously.

9. The method of claim 1, wherein the step of rendering the document on the client computer includes appending the document to a queue.

10. The method of claim 1, wherein updating the administrative settings is initially performed in association with registering the target networked printer device on the client computer.

11. The method of claim 1, wherein the step of applying the stored administrative settings to the document further comprises:
    applying the stored administrative settings to the document if the print server computer is not available.

12. The method of claim 1, wherein the step of applying the stored administrative settings to the document further comprises:

performing the step of updating the stored administrative settings before applying the stored administrative settings to the document if the print server computer is available.

13. A client computer system in a network facilitating client side print rendering in response to an application issuing a command to print a document, the client computer system comprising:
an operating system for processing and interpreting the print command;
a printing router for routing the print command to a remote printing subsystem according to a designated target networked printer device;
the remote printing subsystem for storing administrative settings received from a print server computer and forwarding the document transformed into a native printer language to the print server computer to cause printing of the transformed document without additional conversion by the print server computer, the administrative settings including at least information sufficient to permit the client computer system to transform the document into the native printer language of the target networked printer device;
a rendering subsystem for applying the stored administrative settings to the document and transforming the document according to the native printer language utilized by the target networked printer device; and
a synchronization manager for requesting from the print server computer current administrative settings for the target networked printer device, the synchronization manager being configured to perform the updating at a periodic time interval.

14. The computer system of claim 13, wherein the synchronization manager requests the current administrative settings periodically.

15. The computer system of claim 13, wherein the synchronization manager requests the current administrative settings before the rendering subsystem applies the stored administrative settings.

16. The computer system of claim 13, further comprising:
a reachability event system for polling the print server computer if the print server computer is not available.

17. The computer system of claim 16, wherein the reachability event system polls the print server computer periodically.

18. The computer system of claim 16, wherein the reachability event system polls the print server computer in response to device and network activity indicating that the print server may be available.

19. A computer readable medium comprising computer executable instructions for carrying out a method for remotely printing a document on a network comprising a networked client computer, a target networked printer device and a print server computer, the method comprising:
storing administrative settings for the target networked printer device applied by the print server computer on the client computer, the administrative settings including at least information sufficient to permit the client computer to render the document in a native printer language of the target networked printer device;
updating, using a synchronization manager on the client computer, the stored administrative settings to maintain synchronization with current print server computer administrative settings, the synchronization manager being configured to perform the updating at a periodic time interval;
applying the stored administrative settings to the document on the client computer;
based on the administrative settings, rendering the document in the native printer language of the target networked printer device on the client computer; and
sending the rendered document to the print server computer to print without additional conversion of the rendered document by the print server.

20. The computer-readable medium of claim 19, wherein the step of rendering the document on the client computer further comprises:
polling the network when the print server computer is not available to determine when the print server computer becomes available.

21. The computer-readable medium of claim 20, wherein the step of polling the network further comprises polling the print server computer in response to device and network activity indicating that the print server computer may be available.

22. The computer-readable medium of claim 20, wherein the step of polling the network further comprises periodically polling the network.

23. The computer-readable medium of claim 19, wherein the step of applying the stored administrative settings to the document further comprises:
applying the stored administrative settings to the document if the print server computer is not available.

24. The computer-readable medium of claim 19, wherein the step of applying the stored administrative settings to the document further comprises:
performing the step of updating the stored administrative settings before applying the stored administrative settings to the document if the print server computer is available.

25. A network system for facilitating client side print rendering in response to an application issuing a command to print a document, the network system comprising:
a client computer, wherein the client computer comprises:
an operating system for processing and interpreting the print command;
a printing router for routing the print command to a remote printing subsystem according to a designated target networked printer device;
the remote printing subsystem for storing administrative settings received from a print server computer and forwarding the document transformed into a native printer language to the print server computer, the administrative settings including at least information sufficient to permit the client computer to transform the document into the native printer language of the target networked printer device;
a rendering subsystem for applying the stored administrative settings to the document and transforming the document according to the native printer language utilized by the target networked printer device;
a synchronization manager for requesting from the print server computer current administrative settings for the target networked printer device, the synchronization manager being configured to perform the requesting at a periodic time interval;
the print server computer for maintaining the current administrative settings for the target networked printer device, for sending the current administrative settings to the client computer upon receipt of a request, and for forwarding the transformed document to the target networked printer device without additional conversion of the transformed document by the print server; and
the target networked printer device for creating an output from the transformed document.

* * * * *